United States Patent [19]

Flynn et al.

[11] Patent Number: 6,010,562
[45] Date of Patent: Jan. 4, 2000

[54] PAINTING SYSTEM USING DESICCANT DEHUMIDIFIER FOR CONDITIONING AND REMOVING VOCS FROM VENTILATION AIR TO BE RETURNED TO SPRAY BOOTH

[76] Inventors: Paul Jeffrey Flynn, 24 Woodcrest Dr., Geneseo, Ill. 61254; William Carl Nowack, 340 Kriwel, Twin Lakes, Wis. 53181; Philip Leroy Carter, 1004 Killdeer Ct., Geneseo, Ill. 61254

[21] Appl. No.: 08/924,819

[22] Filed: Sep. 5, 1997

[51] Int. Cl.[7] .................................................. B01D 53/06
[52] U.S. Cl. ......................... 96/125; 55/DIG. 46; 96/150
[58] Field of Search ....................... 95/113, 107; 96/125, 96/150; 55/DIG. 46

[56] References Cited

U.S. PATENT DOCUMENTS

| | | | |
|---|---|---|---|
| 4,261,707 | 4/1981 | Bradshaw et al. | 55/DIG. 46 |
| 4,265,642 | 5/1981 | Mir et al. | 55/DIG. 46 |
| 4,475,295 | 10/1984 | Hussmann | 96/125 |
| 4,537,120 | 8/1985 | Josefsson | 55/DIG. 46 |
| 4,689,054 | 8/1987 | Vara et al. | 95/113 |
| 5,039,313 | 8/1991 | Gocht | 55/DIG. 46 |
| 5,153,028 | 10/1992 | Shutic et al. | 55/DIG. 46 |
| 5,165,969 | 11/1992 | Barlett et al. | 55/DIG. 46 |
| 5,444,029 | 8/1995 | Martin | 55/DIG. 46 |

FOREIGN PATENT DOCUMENTS

| | | | |
|---|---|---|---|
| 178204 | 4/1986 | European Pat. Off. | 55/DIG. 46 |
| 513599 | 11/1992 | European Pat. Off. | 55/DIG. 46 |
| 3718035 | 12/1988 | Germany | 55/DIG. 46 |

OTHER PUBLICATIONS

Nautica Dehumidifier's Home Page, Sep. 1997.
Desiccant Cooling and Dehumidification Equipment Product Section Formed At ARI, Sep. 1997.
Munters Corporation Cargocaire Division, Sep. 1997.
Bry–Air, Inc, Sep. 1997.
American Gas Cooling Center, Sep. 1997.
American Gas Cooling Center Seasons .4 Desiccant System, Sep. 1997.

*Primary Examiner*—Duane S. Smith

[57] ABSTRACT

A painting system includes a paint spray booth ventilated by process air including a combination of outside make-up air and a portion of the exiting process air which is returned to the booth, the returned air being the main component of the combination. The humidity of the air in the paint spray booth is controlled by routing a first minor portion of the process air, exiting the booth, through a desiccant dehumidifier, which removes moisture and volatile organic compounds (VOCs) from this process air portion before it is sent back to the paint spray booth. The dehumidifier is designed so that at any given time the process air portion contacts only part of the desiccant bed while air heated to approximately 250° F. in a paint cure oven is exhausted from the oven and directed through the remaining part of the desiccant bed in order to dry, and thus regenerate, the desiccant for continued use. The dehumidifier is designed so that a continual exchange of dried desiccant for moisture laden desiccant respectively takes place relative to the process and heated air streams. The heated air also removes a large portion of the volatile organic compounds removed from the first minor portion of the process air. A second minor portion of the process air exiting from the paint spray booth, equal to the volume of make-up air, and the heated regenerative air exiting the dehumidifier are routed through a control device, such as a thermal oxidizer, which destroys the volatile organic compounds contained in this air before exhausting it to the atmosphere.

11 Claims, 1 Drawing Sheet

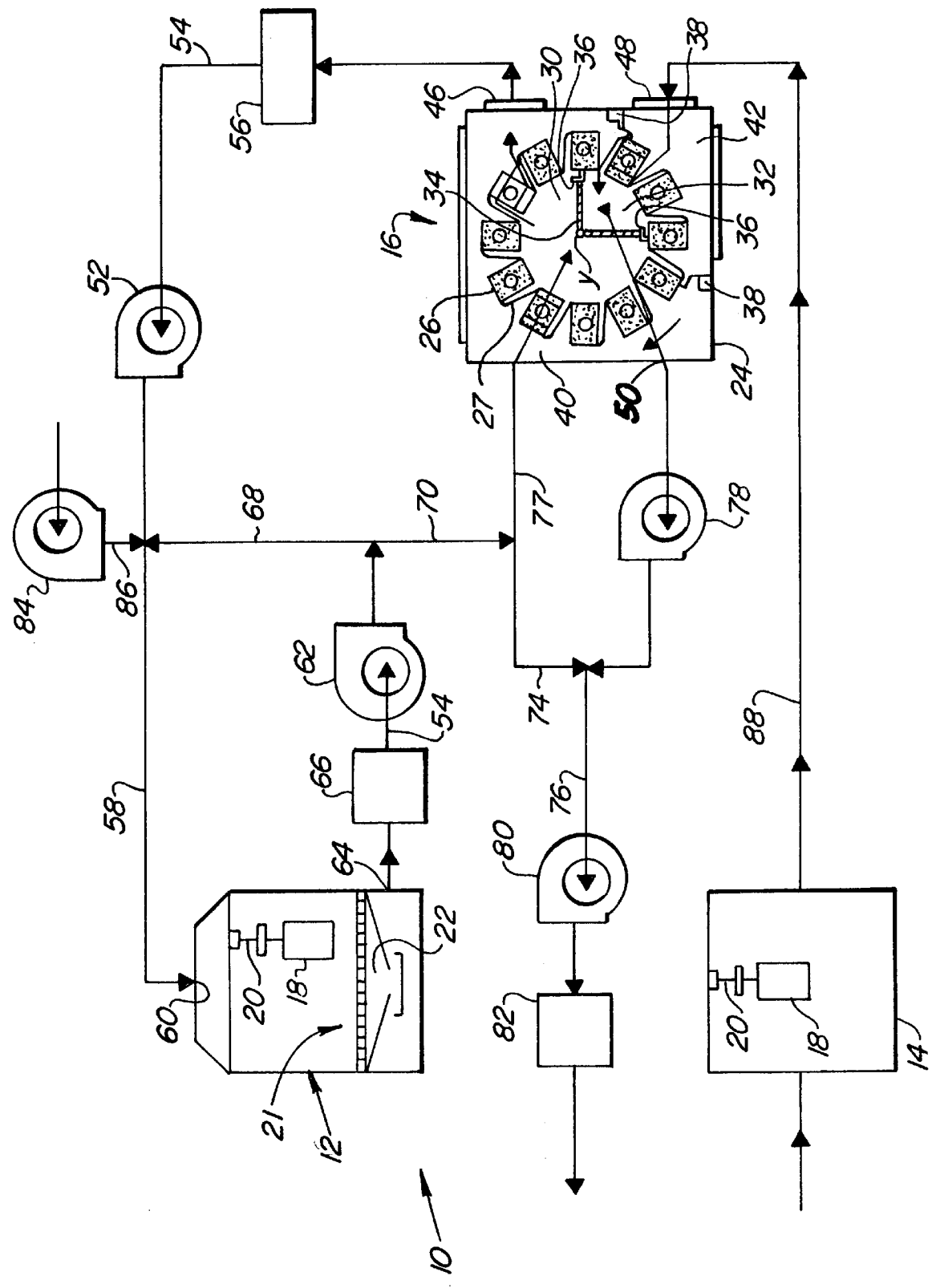

PAINTING SYSTEM USING DESICCANT DEHUMIDIFIER FOR CONDITIONING AND REMOVING VOCS FROM VENTILATION AIR TO BE RETURNED TO SPRAY BOOTH

BACKGROUND OF THE INVENTION

The present invention relates to painting systems including water-wash paint spray booths ventilated by recirculating process air through the booth.

It is conventional to ventilate a paint spray booth with a relatively large volume of process air in order to maintain an acceptable working environment within the spray booth. Two of the largest costs of operating a spray painting facility are preconditioning fresh make-up air to the required standards or characteristics, temperature and humidity, e.g., for use in the spray booth and for decontaminating, i.e., removing volatile organic compounds (VOCs) from that portion of the process air discharged to the atmosphere after leaving the spray booth. A known practice to reduce the costs associated with preconditioning fresh make-up air entering, and removing VOCs from air exhausted from, a spray booth is to reduce the volume of entry and exit air required to be treated, while preserving total process air flow through the spray booth work area or place, by directing a large portion of the ventilating air back to the booth. In popular use are water wash paint spray booths that include a sheet of water for collecting over-sprayed paint and for converting isocyanates, resulting from use of polyurethane paints, to harmless urea. In these booths, the relative humidity may approach 100% causing serious difficulties for paint application. While it is known to address these difficulties by employing refrigeration-type dehumidification to lower the humidity of the fresh air entering and/or process air being recirculated to the spray booth, this manner of dehumidification is very expensive, complex and difficult to maintain.

SUMMARY OF THE INVENTION

According to the present invention, there is provided an improved system for painting objects within a paint spray booth, and more particularly there is provided an improved manner of maintaining the quality (the humidity and temperature) of process air, used to ventilate the paint spray booth, at an acceptable level, i.e., at a level which does not negatively impact the condition of the paint sprayed onto an article being painted.

An object of the invention is to provide a spray painting system wherein a major portion of the process air used in ventilating a paint spray booth work place is recirculated to the work place and to provide a relatively inexpensive way to efficiently dehumidify the recirculated air so that, no matter what the humidity is of fresh make-up or replacement air entering the work place, the humidity of the totality of the air flowing through the work place is kept at a level which does not negatively impact the quality of the coating of the article being painted.

A more specific object of the invention is to provide a spray painting system wherein about 90% of the total air flow used to ventilate the paint spray booth is recirculated or returned to the booth and wherein about 20% of this recirculated air is routed through a desiccant dehumidifier prior to being returned to the booth, the dehumidified air being recombined with the larger volume of unconditioned air and with the fresh make-up air entering the booth so as to lower the humidity of the total volume of process air passing through the paint spray booth to an acceptable level.

Yet another specific object of the invention is to provide a painting system, as set forth in the immediately preceding object, and further including a paint cure oven with heated air from the oven being routed to the desiccant dehumidifier so as to draw retained moisture from, and thus regenerate or reactivate, the desiccant material so that it is once again able to dehumidify a portion of the paint booth process air leaving the spray booth before being returned to the booth.

Still another object of the invention is to provide a painting system, as set forth in one or more of the preceding objects, wherein the desiccant dehumidifier also operates to remove a significant amount of volatile organic compounds from that portion of the paint spray booth process air routed to the dehumidifier after leaving the booth.

A further object of the invention is to provide a painting system, as set forth in one or more of the preceding objects, wherein the paint spray booth is a water-wash booth which operates to remove heavy metals from the over-sprayed paint.

These and other objects will be apparent from a reading of the ensuing description together with the appended drawing.

BRIEF DESCRIPTION OF THE DRAWING

The sole FIGURE is a schematic showing of a painting system including a water-wash spray paint booth, a paint cure oven, a desiccant dehumidifier, a VOC abatement device, an air cooling device and various fans coupled in ductwork arranged for effecting the desired air flow among these components in accordance with the present invention.

DESCRIPTION OF THE PREFERRED EMBODIMENT

Referring now to the drawing, there is shown a spray painting system 10 including a spray booth 12, paint cure oven 14 and desiccant dehumidifier 16.

The spray booth 12 is, for example, of a water-wash type which uses a water scrubber to wash away paint which is over-sprayed while spray painting an article 18 to be painted, shown here suspended from a conveyor 20 which would in most instances carry a plurality of the articles 18, one after the other. The ventilation air flows downwardly through the area where the article 18 is being spray painted and aids in bringing the over-sprayed paint into contact with a water scrubber 21 including a catch area 22 where the paint solids, including hazardous heavy metals, separate from the water and accumulate for removal from time to time.

The conveyed articles 18 are painted one after the other with the conveyor 20 moving the painted articles 18 from the booth 12 and into the paint cure oven 14 by way of openings (not shown) respectively provided in the walls of the booth and oven. The oven 14 may be of any well known construction including a heat source capable of heating air in the oven to a paint cure temperature of about 250° F., for example.

While any desiccant dehumidifier system of a type having desiccant bed arrangements which operate such that one portion of the bed is being used for removing humidity from process air while a second portion of the bed is being regenerated or reactivated by having moisture removed therefrom, the desiccant dehumidifier 16 shown here is of a type capable of continuously dehumidifying a given process air stream so that the air stream has a substantially constant relative humidity as it leaves the dehumidifier. Specifically, while not shown in detail, the dehumidifier 16 includes a substantially air tight, cubical housing 24 containing a driven carrousel (not shown) rotatable about a fixed axis Y and including a plurality of equi-spaced desiccant chambers 26 arranged annularly about the axis Y with adjacent chambers 26 being interconnected by an air impervious panel 27 extending from an inner corner of one chamber to an outer corner of the adjacent chamber. The chambers 26 each contain a supply of granular desiccant, e.g., silica gel, thus forming a plurality of modular desiccant beds. A central cylindrical zone is bounded by the chambers 26 and is divided into a major zone portion 30 and a minor zone portion 32 by an angular wall 34 having respective legs joined so as to define a corner, which extends along the axis Y, and having radially outer terminal edges joined to seal structures 36 disposed for engaging radially inner walls of the chambers 28 as the latter rotate past the seal structures. The legs of the angular wall 34 form a right-angle, with the major and minor inner zone portions 30 and 32 thus constituting three-fourths and one-fourth, respectively, of the cylindrical zone. A pair of outer seal structures 38 are fixed to adjacent walls of the housing 24 so as to engage radially outer surfaces of the chambers 28 as they rotate past the seal structures, the seal structures 38 acting to divide an outer zone, defined by and located between radially outer surfaces of the chambers 28 and the housing 24, into outer major and minor zone portions 40 and 42, respectively, constituting approximately three-fourths and one-fourth of the total volume of the outer zone. The placement of the seal structures 38 is such that the major inner and outer zone portions 30 and 40, and the minor inner and outer zone portions 32 and 42 are respectively in fluid communication with each other by way of respective paths through the granular desiccant contained in the chambers 28. A process air inlet (not shown) is provided in a wall of the housing 24 in direct fluid communication with the inner major zone portion 30 while a process air outlet 46 is formed in a wall of the housing 24 in communication with the outer major zone portion 40. Similarly, a regeneration or reactivation air inlet 48 is formed in the housing 24 in direct fluid communication with the outer minor zone portion 42 while a regeneration or reactivation air outlet (not shown) is in direct communication with the inner minor zone portion 32.

A known desiccant dehumidifier of the above-described type is the MVB Series Dehumidifier marketed by Bry-Air, Inc. of Sunbury, Ohio. However, it should be noted that other types of desiccant dehumidifiers, for example those having separate fixed desiccant beds through which process and regeneration air is alternately passed, may be used.

A spray booth air supply fan 52 has its inlet coupled, as by a duct 54, to the process air outlet 46 of the dehumidifier 16, the duct 54 containing a cooling element in the form of a water coil 56 for removing the heat of adsorption and the carry over heat resulting from the regeneration of the desiccant, from the ventilation or process air. The process air supply fan 52 has an outlet coupled, as by a duct 58, to the booth 12, as at 60, while a spray booth air recirculation fan 62 has an inlet coupled to the booth 12, as at 64.

The relative humidity of the air at the outlet 64, which is just downstream from the water scrubber 21 is always nearly 100%. The temperature of this air depends on the temperature and relative humidity of the air entering the scrubber 21, and to a lesser extent, on the temperature of the water. Ordinarily, the water is reused in the scrubbing system, with make-up water supplied to accommodate evaporation. The water in the system generally reaches an equilibrium temperature such that the most significant factor affecting the air temperature is the evaporative cooling taking place in the scrubber 21.

The ventilation or process air drawn from the spray booth 12 by the fan 62 first passes through a mist eliminator and filter assembly 66 and then enters the fan 62 where it is discharged and split into a major part, about 70%, for example, which is returned to the inlet 60 of the booth, as by a duct section 68 coupled to the duct 58, and with a minor part, about 30%, for example, passing through a second duct section 70. Approximately one-third of the air carried by the duct section 70, or about 10% of the air exiting the recirculation fan 62, is coupled, as by a duct section 74, to a system exhaust duct 76, while approximately two-thirds of the air carried by the duct section 70, or about 20% of the air exiting the recirculation fan 62, is coupled, as by a duct section 77, to the process air inlet (not shown) that is in direct communication with the inner major zone portion 30 of the dehumidifier 16. It is to be noted that the division of the process air flowing from the recirculation fan 62 may be done by appropriately sizing the ductwork and/or by using adjustable dampers (not shown), with the amount of ventilation air sent through the dehumidifier determining the relative humidity and temperature of the air in the spray paint booth 12. For example, in the particular installation used to develop the present invention, an operating condition in the 80% to 90% relative humidity range at ambient indoor temperatures was achieved by routing about 25% of the recirculating air through the dehumidifier 16. By removing additional heat from the air exiting the dehumidifier 16, the spray booth 12 can be operated at below ambient indoor temperature. By passing a greater percentage of the recirculating air through the dehumidifier 16 and cooling it, even lower booth relative humidity can be realized.

The system exhaust duct 76 is connected between the outlet of an oven exhaust fan 78 and an inlet of a paint system exhaust fan 80, the oven exhaust fan 78 having its inlet coupled to the regeneration air outlet 50 of the dehumidifier 16. The system exhaust fan 80 has its outlet coupled to atmosphere by way of a suitable control or abatement device 82 for destroying VOCs entrained in the exhaust air, an example of such a device being a regenerative thermal oxidizer.

Since approximately 10% of the process air is exhausted to atmosphere, this air has to be replaced and this is done by a fresh air make-up fan 84 having its inlet coupled to atmosphere and having its outlet coupled, as by a fresh air supply duct 86, to the process air supply duct 58 at a location between the supply fan 52 and the spray paint booth 12.

The desiccant in the dehumidifier 16, which is contacted by the air flowing from the inner major zone 32 to the outlet 46, absorbs moisture from the air resulting in the air becoming dried and heated due to the exothermic action of absorption. Adequate removal of this heat from the air exiting the dehumidifier was achieved in the installation used for developing the instant invention by providing the cooling coil 56 with 85° F. cooling water. The reactivating or regenerating air inlet 48 of the dehumidifier 16 is connected to the paint cure oven 14 by a duct 88 so that air heated to about 250° in the oven will be drawn through the dehumidifier 16 by the action of the fan 78 so as to pick up moisture from the desiccant located in its flow path through the dehumidifier 16.

It is here noted that the desiccant not only removes moisture, but also acts to remove a significant amount (up to 80% or more) of the VOC's from the air stream delivered by the fan 62 to the dehumidifier via the duct sections 70 and 77 as the air stream comes into contact with the desiccant, these captured VOCs, in turn, being removed from the desiccant by the regeneration or oven exhaust air stream drawn through the dehumidifier 16 by the oven exhaust fan 78 for removing moisture from the desiccant.

With a reasonably constant inlet air temperature, the desiccant dehumidifier 16, used in developing the present invention, achieved a certain lower level of humidity regardless of the humidity of the inlet air. As stated above, the relative humidity of the air immediately downstream from the water scrubber 21 is nearly 100%. Assuming the make-up air, because of its small volume, plays no significant role in determining the relative humidity of the ventilation air, the relative humidity in the spray booth 12 is determined by the percentage of recirculating air which is passed through the dehumidifier 16 and the final temperature of the mixed air supplied to the booth. The temperature of the recirculating air not passing through the dehumidifier is related only to the temperature and humidity of the air in the booth, as these factors dictate what evaporative cooling will occur in the water scrubber 21.

The operation of the paint system 10 is thought to be evident from the forgoing description and for the sake of brevity is not repeated. Suffice it to say, that by using the desiccant dehumidifier 16 to dehumidify only a small first portion of the process air drawn from the paint spray booth 12 by the recirculation fan 62, it is possible to return a large second portion of the process air back to the booth without any treatment at all with the humidity and temperature of this returned air being maintained at respective values which do not adversely affect the quality of the paint applied to an article 18. Further, only a minor second portion of the process air drawn from the spray booth 12 is exhausted to atmosphere and therefore only this small amount of air is required to be subjected to the thermal oxidizer 74 for removing VOCs entrained therein. Further, because only this small amount of air is removed from the painting system, only an equal small amount of outside or fresh make-up air is required to be added so that the process air adequately ventilates the spray paint booth 12. Thus, costs associated with treating incoming fresh air and air exhausted to the atmosphere are minimized.

We claim:

1. A ventilating system for an enclosure defining a work space, said enclosure containing a water scrubber and being provided ventilation air intake and exhaust openings; an air supply fan coupled to said enclosure for effecting a flow of ventilation air from said intake opening to said exhaust opening, with said water scrubber being located for contact by the flow of ventilation air; an air recirculation fan having an inlet coupled to said exhaust opening and an outlet coupled to said intake opening; a desiccant dehumidifier having a recirculation air inlet coupled to said recirculation fan outlet; flow control means for limiting the flow to said desiccant dehumidifier inlet to a minor portion of the air flow exiting said recirculation fan; said desiccant dehumidifier including a recirculation air outlet coupled for returning dehumidified recirculation air to said ventilation air intake opening.

2. The ventilating system defined in claim 1 wherein said desiccant dehumidifier also includes a regeneration air inlet and a regeneration air outlet; and a source of heated regeneration air being connected to said regeneration air inlet.

3. A painting system, comprising: a paint spray booth; a spray booth air supply fan means coupled for causing process air to flow through and ventilate an interior of the booth; process air duct means conveying said process air away from said spray booth interior and dividing the process air into a major portion directed back to said spray booth interior and into a minor portion; a desiccant dehumidifier including a desiccant bed means; said process air duct means coupling at least a first part of said minor portion of said process air to said dehumidifier for flowing through and contacting a first section of said desiccant bed means and then returning said first part to said spray booth, whereby moisture and volatile organic compounds are removed from said first part of said minor portion of said process air.

4. The painting system defined in claim 3 wherein said painting system includes a source of relatively hot regenerative air; regenerative air duct means coupled between said source and said desiccant dehumidifier for directing said regenerative air through a second section of said desiccant bed means of the dehumidifier to thereby remove moisture and volatile organic compounds from and, thus, regenerate said second section of said desiccant bed means.

5. The painting system defined in claim 4 wherein said painting system includes a paint cure oven for receiving painted articles from the spray paint booth and drying the paint on the articles; means for heating air in the oven to a paint cure temperature; said heated air in said oven serving as said source of relatively hot regenerative air; and an oven exhaust fan connected to said regenerative air duct means for causing said regenerative air to flow through said regenerative air duct means.

6. The painting system defined in claim 5 wherein said process air duct means divides said minor portion of said process air into said first part and into a second part; a volatile organic compound control device means; and exhaust air duct means coupled for directing said second part of said minor portion of said process air exiting said paint spray booth and said regenerative air exiting from said desiccant dehumidifier to said control device means, whereby volatile organic compounds entrained in the air directed to said control device means are destroyed; a source of fresh make-up air; and make-up air means for directing a quantity of said make-up air, equal to said second part of said minor portion of said process air, to said spray paint booth.

7. In a painting system including a spray paint booth; a source of fresh make-up air; an air supply fan coupled for effecting a flow of process air including make-up air through said booth for ventilating the booth; a major portion of said process air exiting said booth being recirculated to said spray paint booth; and a dehumidifier coupled for removing moisture from at least a first part of a minor portion of said process air prior to said first part being returned to said spray paint booth, the improvement comprising: said dehumidifier being a desiccant dehumidifier acting also to remove a major portion of volatile organic compounds entrained in said first part of said minor portion of said process air exiting said spray paint booth.

8. The painting system defined in claim 7 and further including a source of desiccant regeneration air connected to said dehumidifier for removing moisture collected by desiccant of said dehumidifier.

9. The painting system defined in claim 8 and further including a paint cure oven through which flows heated air serving as said source of desiccant regeneration air; and means connecting said heated air to said desiccant dehumidifier for regenerating the desiccant thereof.

10. The painting system defined in claim 9 wherein a second part of said minor portion of said process air exiting said booth is combined with said regeneration air after it exits said dehumidifier to form a stream of exhaust air; and a volatile organic compound control device being coupled for receiving said stream of exhaust air before the latter is exhausted to atmosphere.

11. The painting system defined in claim 9 wherein said spray paint booth contains a water scrubber for removing heavy metals introduced into the paint booth during spray painting.

* * * * *